United States Patent [19]

Andō

[11] Patent Number: 4,725,725
[45] Date of Patent: Feb. 16, 1988

[54] OPTICAL HEAD

[76] Inventor: Hideo Andō, 357-16 Hodokubo, Hino-shi, Tokyo, Japan

[21] Appl. No.: 945,527

[22] Filed: Dec. 23, 1986

Related U.S. Application Data

[62] Division of Ser. No. 682,922, Dec. 18, 1984, Pat. No. 4,654,519.

[30] Foreign Application Priority Data

Dec. 19, 1983 [JP] Japan .................................. 58-239394

[51] Int. Cl.⁴ ............................. H01J 5/16; G11B 7/12
[52] U.S. Cl. ............................................ 250/216; 369/44
[58] Field of Search .................. 250/216, 201 DI, 204, 250/208, 209; 369/44-46, 111, 112

[56] References Cited

U.S. PATENT DOCUMENTS 4,100,577  7/1978  Naruse et al. ................... 250/201
4,381,557  4/1983  Jebens ........................... 250/201 DF Primary Examiner—Gene Wan

[57] ABSTRACT

In an optical head, a laser beam emitted from a laser unit is collimated by a collimater lens and is transmitted through a polarized beam splitter and λ/4 plate. The collimated laser beam is converged onto a recording layer of an optical disk by an objective lens. A beam spot corresponding to the beam waist of the converged laser beam is formed on the recording layer in a just-in-focusing state and a beam spot larger than the beam spot corresponding to the beam waist is formed on the recording layer in a defocusing state. The laser beam reflected from the recording layer passes through the objective lens and is λ/4 plate and refracted by the polarized beam splitter. The polarized beam splitter has first and second beams emerging surfaces the first beam emerging surface being arranged perpendicularly to the optical axis and second beam emerging surface being arranged at a predetermined angle to the first beam emerging surface. Accordingly, the laser beam is separated into first and second laser beam components at the first and second beam emerging surfaces by the polarized beam splitter, which are directed in different directions. The first laser beam component is incident on a photodetector for detecting the focusing state of the objective lens.

8 Claims, 8 Drawing Figures

OPTICAL HEAD

This is a division of application Ser. No. 682,922, filed Dec. 18, 1984 now U.S. Pat. No. 4,654,519.

BACKGROUND OF THE INVENTION

The present invention relates to an optical head for focusing an optical beam for recording/reproducing information or recording, reproducing and erasing information on an information recording medium such as an optical disk and, more particularly, to a focus detecting system for detecting the displacement of the focus of an optical head.

Recently, various systems for recording information on an information recording medium, such as an optical disk reproducing or erasing the recorded information, have been developed and proposed. In these systems, a beam spot corresponding to a beam waist of an optical beam converged by an objective lens at recording, reproducing and erasing time is required to be formed on an optical disk. Thus, an optical head has a focus detecting system for detecting the focused state of the lens. For example, a focus detecting system which is called a so-called "knife edge method" was proposed as disclosed in U.S. patent application Ser. No. 399,873 filed on July 19, 1982 by the same assignee as this application, and an EPC application No. 82106508.3, filed on July 19, 1982 as a focus detecting system. In this focus detecting system which is called the knife edge method, a light shielding plate which shields part of an optical beam reflected from a light reflecting surface and permits passage of other components is arranged between the light reflecting surface of the optical disk, i.e., information recording surface and a photo-detector for detecting the focus. The other beam component is directed between a pair of photo sensitive regions of a photo-detector at the focusing time, and the level of the detected signals from a pair of photo sensitive regions is maintained substantially and equally. The other beam component is directed to one of the pair of photo sensitive regions of the photo-detector at nonfocusing time, and the level of the detected signals from the pair of photo sensitive regions is unbalanced. Therefore, whether the objective lens is focused or not can be judged according to the detected signals from the pair of photo sensitive regions.

In the focus detecting system, such as the so-called "knife edge method," it is required to accurately dispose the light shielding plate in an optical passage of the light beam, and it is necessary to pay careful attention in alignment at assembling time, and there arises a problem that the assembling work becomes complicated. Further, a space for disposing the light shielding plate is required, the space should be sufficiently large to simplify the assembling work, and the system itself cannot be accordingly reduced compact in size.

SUMMARY OF THE INVENTION

An object of the present invention is to provide an optical head which can be readily assembled in a compact structure.

According to one aspect of the present invention, there is provided an optical head for focusing a light beam onto an information recording layer comprising a light source for generating a light beam, an objective lens for converging the light beam toward the information layer, transferring the light beam reflected from the information recording layer so that a beam spot corresponding to the beam waist of the light beam is formed on the recording layer in the just-in-focusing state, and a beam spot larger than the beam spot corresponding to the beam waist of the light beam is formed on the recording layer in a defocusing state, a first refractive member having first and second light beam emerging surfaces for separting the light beam transferred from the objective lens into first and second light beam components directed toward the different direction, means for converting the first and second light beam components, and first photo-detecting means having first and second photo sensitive regions so that the first converged light beam component is incident thereon.

DETAILED DESCRIPTION OF THE PREFERRED EMBODIMENTS

Figure 1:
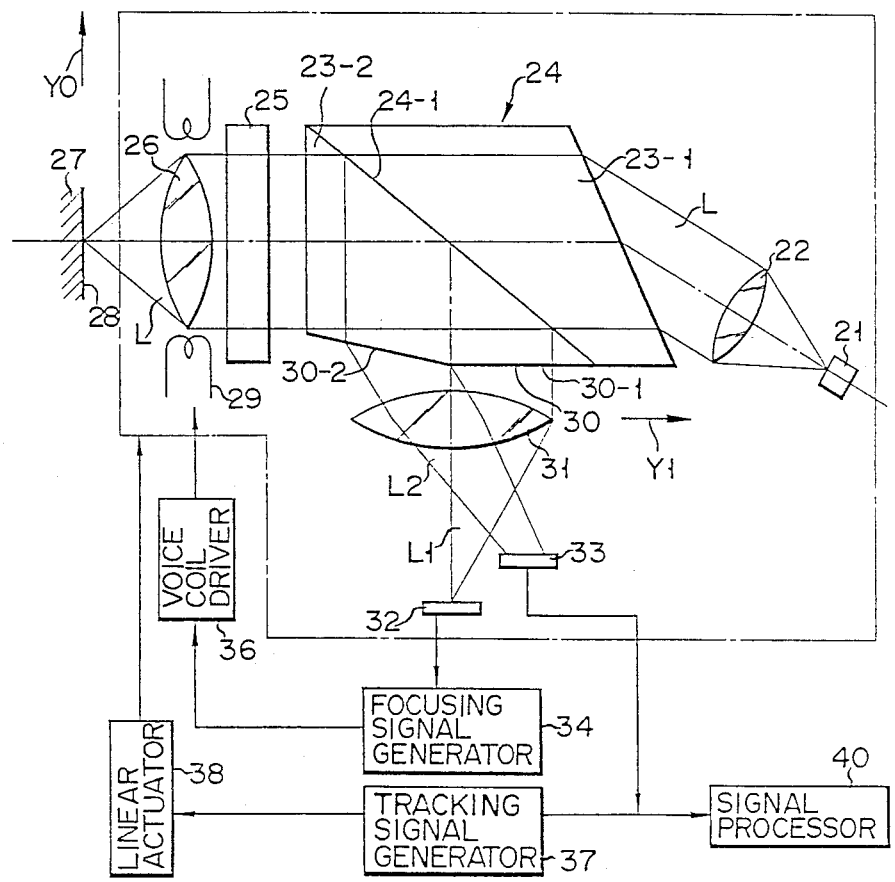
FIG. 1 is a schematic view showing an optical head of a first embodiment according to the present invention.

FIG. 1 is a schematic view showing an optical head of a first embodiment according to the present invention. In FIG. 1, reference numeral 21 designates a semiconductor laser device. A laser beam L generated from the laser device 21 is converted into parallel luminous flux through a collimater lens 22, and directed toward a polarized beam splitter 24. The parallel laser beam L passed through the splitter 24 is incident through a λ/4 plate 25 to an objective lens 26, thereby focusing the beam L toward the light reflecting layer or the recording layer 28 of an information recording medium, i.e., an optical disk 27. The optical disk 27 has a tracking guide (not shown) which extends along a direction Y0 perpendicular to the optical axis. The lens 26 is supported and can be moved along the optical axis by a voice coil 29. When the lens 26 is disposed at a predetermined position, the beam waist of the focusing laser beam L emitted from the lens 26, is projected to the light reflecting layer or the recording layer 28, and the beam waist spot is formed on the surface of the light reflecting layer or the recording layer 28. In this state, the lens 26 is held in the focused state, and the information can be written, read out or erased. When the information is written, state of the region on a tracking guide on the light reflecting layer or the recording layer 28 is varied, e.g., a pit is formed by the photointensity-modulated laser beam L. When the information is read out, the laser beam L having a predetermined light intensity is photointensity-modulated and reflected by the pit formed on a tracking guide. When the information is erased, the laser beam L having a predetermined light intensity is directed to a tracking guide, and the region is returned to the original state. A divergent laser beam L reflected from the light reflecting layer or the recording layer 28 of the information recording medium 27 is converted to a parallel luminous flux through the lens 26 at the focusing time, and returned again through the λ/4 plate 25 to the splitter 24. When the beam L reciprocates to the λ/4 plate 25, the beam L is rotated at 90° at the polarized plane as compared with the case that the beam L is reflected by the splitter 24, the beam L thus rotated at the polarized plane at 90° does not pass the splitter 24, but is reflected on the splitter 24.

The splitter 24 is formed by bonding a pair of prisms 23-1 and 23-2 through a polarized surface 24-1 as shown in FIG. 1. This splitter 24 is different from the ordinary polarized beam splitter, but the prism 23-2 for passing the laser beam reflected from the light reflecting surface 28 has a function for separating the reflected laser beam into two components. More specifically, the laser beam reflected from the polarized surface 24-1 is passed along the optical axis in the prism 23-2 and emitted out of the prism 23-2 through the two light emitting surfaces 30-1 and 30-2 of the prism 23-2. One light emitting surface 30-1 crosses perpendicularly to the optical axis, and the other light emitting surface is arranged at a predetermined angle to the one light emitting surface 30-1. Both the light emitting surfaces 30-1, 30-2 are arranged along a direction Y1 which is parallel with an image of the direction Y0 formed on the one light emitting surface 30-1 by the optical elements 26, 25, 30 when the direction Y0 into which the tracking guide is extended is transferred by the optical elements 25, 26, 30. Thus, one component L1 of the laser beam passed through one light emitting surface 30-1 rectilinearly propagates, while the other component L2 of the laser beam passed through the other light emitting surface 30-1 is refracted on the surface, and directed toward the direction different from the one component L1. The laser beam components L1 and L2 are all converged by a projection lens 31, one laser beam component L1 is directed toward a photo-detector 32 for detecting the focusing state, and the other laser beam component L2 is directed toward a photo-detector 33 for detecting information and track. In an optical system shown in FIG. 1, the other light emitting surface is determined so that the optical paths of the laser beam components L1 and L2 intersect.

The photo-detector 32 for detecting the focusing state is arranged on an image forming plane on which the image of the beam spot corresponding to the beam waist is formed by an optical system between the photo-detector 32 and the light reflecting layer 28 when the objective lens 26 is maintained in the just in focusing state and the beam spot corresponding to the beam waist is formed on the recording layer 28. For example, when the parallel laser beam is transmitted from the lens 26 to the lens 31 in the just-in-focusing state, the photo-detector 32 is disposed on the rear focusing plane of the lens 31. On the contrary, the photo-detector 33 for detecting the information and the track is disposed in the space except the image forming plane, i.e., on a far field plane.

Figure 2A:
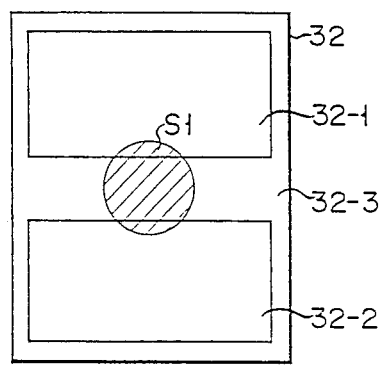
FIGS. 2A, 2B, 2C are plan views respectively showing beam spots formed on a photo-detector for focusing and detecting in just-in-focusing and defocusing state the optical head shown in FIG. 1.
Figure 2B:
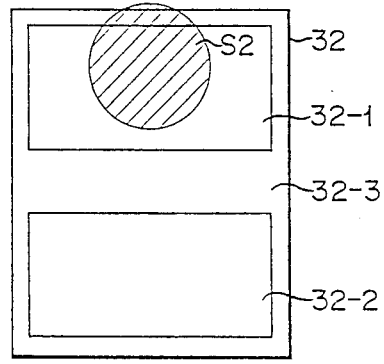
Figure 2C:
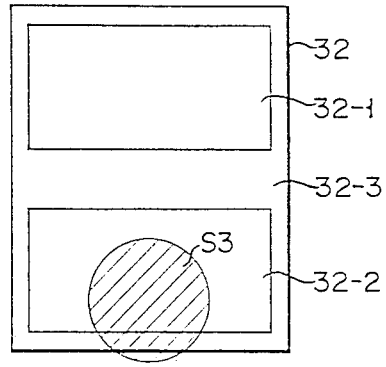

The photo-detector 32 for detecting the focusing state has first and second photo sensitive regions 32-1 and 32-2 divided by photo insensitive regions 36-3 as shown in FIG. 2A. The laser beam components L1 are directed toward the photo insensitive region 32-3 of the photo-detector 32 at the focusing time, and the minimum beam spot S1 is formed as shown in FIG. 2A. The spot S1 is partly formed on the photo sensitive regions 32-1 and 32-2, and these areas are formed equally to each other. Therefore, a focusing signal of zero level is generated from a focusing signal generator 34 for generating a difference signal corresponding to the difference of the electric signals from the photo sensitive regions 32-1 and 32-2 to a voice coil driver 36, with the result that the objective lens remains at its position. When the lens 26 approaches to or separates from the light reflecting surface 28 from the position in the just-in-focusing state, the laser beam components L1 are directed toward either one of the photo sensitive regions 32-1 and 32-2 of the photo-detector 32, and beam spots S2 and S3 larger than the minimum beam spot S1 are formed as shown in FIG. 2B or FIG. 2C. The spots S2 and S3 are almost formed on any of the photo sensitive regions 32-1 and 32-2. Accordingly, a focusing signal of plus or minus level is generated from the focus signal generator 34 for generating the difference signal corresponding to the difference of the electric signals from the photo sensitive regions 32-1 and 32-2 to the voice coil driver 36. As a result, the objective lens is moved to approach the light reflecting surface 28 or to separate from the surface by the voice coil driver 29, in order to move to the focusing state.

Figure 3A:
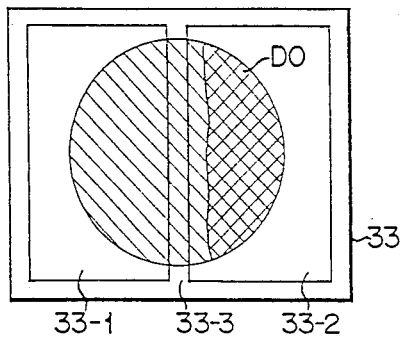
FIGS. 3A, 3B, 3C are plan views respectively showing refractive patterns in the beam spot formed on the photo-detector for detecting information and for detecting track in the just-in-focusing state in the optical head shown in FIG. 1.
Figure 3B:
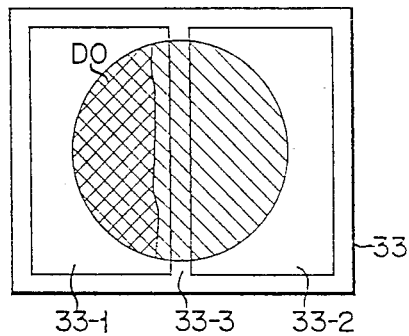
Figure 3C:
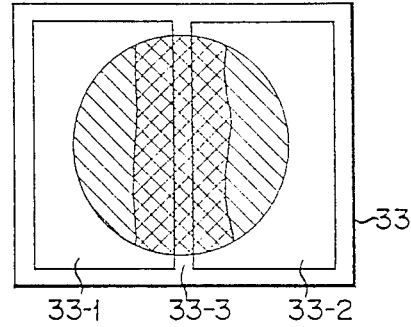

The photo-detector 33 disposed on the far field plane for detecting the information and the track has first and second photo sensitive regions 33-1 and 33-2 divided by the photo insensitive region 33-3 as shown in FIG. 3A. The components L2 is converged by the lens 31 toward the photo-detector 33 for detecting the information and the track, and a beam spot S4 larger than the minimum beam spot S1 is formed even at the just-in-focusing state. A signal processor 40 connected to the first and second photo sensitive regions 33-1 and 33-2 of the photo-detector 33 adds the electric signals from the first and second photo sensitive regions 33-1 and 33-2 of the photo-detector 33 in the just-in-focusing state and converts into an information signal corresponding to the information recorded on the recording layer 28. A diffracted image of the tracking guide is formed as a dark area in the beam spot S4, but the diffracted image D0 of the tracking guide is formed over two photo sensitive regions 33-1 and 33-2 substantially in the same area while the laser beam directed from the lens 26 toward the light reflecting layer 28 is correctly tracing the tracking guide. Consequently, a tracking signal of zero level is generated from the tracking signal generator 37 for generating the difference signal corresponding to the difference of the electric signals from the photo sensitive regions 33-1 and 33-2 to a linear actuator 38, with the result that the signal remains at the position. When the laser beam directed from the lens 26 toward the light reflecting surface 28 does not correctly trace the tracking guide, the components L2 form a beam spot S4 on the photo sensitive regions 33-1 and 33-2 of the photo-detector 33, and diffracted image D0 is formed on any of the photo sensitive regions 33-1 and 33-2 as shown in FIG. 3C. Therefore, a tracking signal of plus or minus level is generated from the tracking signal generator 37 for generating the difference signal corresponding to the difference of the electric signals from the photo sensitive regions 33-1 and 33-2 to the linear actuator 38, with the result that an optical head is moved by the actuator 38 in a direction parallel to the light reflecting surface 28, and the laser beam is correctly directed to the tracking guide.

Figure 4:
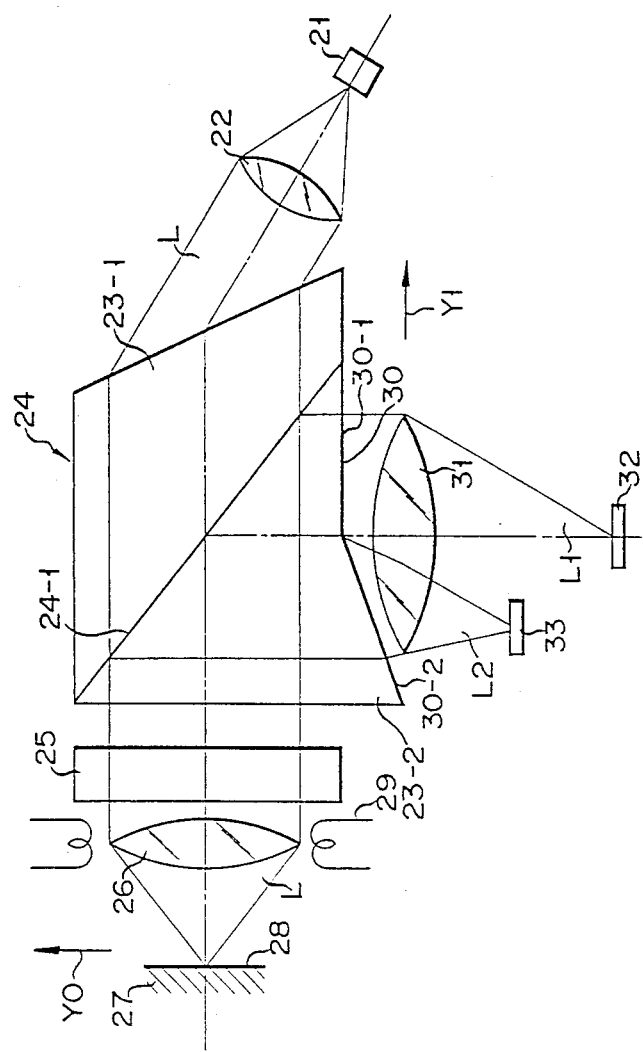
FIG. 4 is a schematic view showing an optical head of a second embodiment according to the present invention.

In the optical head shown in FIG. 1, the other light emitting surface is determined to intersect the optical paths of the laser beam components L1 and L2. However, the light emitting surface may be determined as shown in FIG. 4 so that the optical paths of the L1 and L2 do not intersect, but extend in different directions.

In the optical head shown in FIG. 1, the splitter 24 is formed by bonding a pair of prisms 23-1 and 23-2 through a polarized surface 24-1. However, the prism 23-2 may be separated and disposed in the splitter 24, and an ordinary polarized beam splitter is used as the splitter 24, and a prism may be newly provided as a member for separating the laser beam into two components. Further, a half mirror (not shown) may be used as a beam splitter instead of the polarized beam splitter.

According to the present invention as described above, the optical head of the invention does not necessitate the use of the knife edge, thereby readily assembling the head and forming the head itself in a compact structure.

What is claimed is:

1. An optical head for focusing a light beam onto an information recording layer comprising:
   a light source for generating a light beam;
   an objective lens for converging the light beam toward the information recording layer and for transferring the light beam reflected from the information recording layer, so that a beam spot corresponding to the beam waist of the light beam is formed on the information recording layer in the just-in-focusing state and a beam spot larger than the beam spot corresponding to the beam waist of the light beam is formed on the information recording layer in a defocusing state;
   a first refractive member having first and second light beam emerging surfaces for separating the light beam received from the objective lens into first and second light beam components, the first and second light beam components being directed in different directions;
   means for converging the first and second light beam components; and
   first photo-detecting means having first and second photo sensitive regions to which the converged first light beam component received from said converging means is directed.

2. The optical head according to claim 1, further comprising:
   an optical system arranged between the light source and the objective lens, for passing a light beam directed from the light source to the objective lens, for reflecting the light beam received from the objective lens to the photo-detecting means, said optical system including a $\lambda/4$ plate and a polarized beam splitter.

3. The optical head according to claim 2, wherein the polarized beam splitter comprises at least two splitter refractive members bonded to each other.

4. The optical head according to claim 1, further comprising:
   second photo-detecting means having first and second photo sensitive regions so that the converged second light beam component received from said converging means is incident thereon.

5. The optical head according to claim 1, wherein the first and second photo sensitive regions of said first photo-detecting means are disposed substantially on an image forming plane on which the image of a beam spot on the information recording layer is formed by an optical system arranged between the information recording layer and the photo-detecting means in the just-in-focusing state.

6. The optical head according to claim 1, further comprising:
   means connected to the first and second photo sensitive regions of said first photo-detecting means for generating a focusing signal meaning the just-in-focusing state of the objective lens by the electric signals from the first and second photo sensitive regions; and
   means for moving the objective lens along the optical axis thereof in response to the focusing signal.

7. The optical head according to claim 1, wherein said light reflecting layer has a tracking guide, further comprising:
   second photo-detecting means having first and the photo sensitive regions so that second converged second light beam component is incident thereon;
   means connected to the first and second photo sensitive regions of said second photo-detecting means for generating a tracking signal for determining whether or not the light beam correctly traces the tracking guide, from the electric signals from the first and second photo sensitive regions; and
   means for moving the objective lens in response to the tracking signal in a direction perpendicular to the optical axis thereof.

8. The optical head according to claim 1, wherein the information recording layer has a tracking guide and the first and second light beam emerging surfaces are arranged along a direction parallel to an image of the tracking guide formed on the first light beam emerging surface by the objective lens and the first refractive member.

* * * * *

UNITED STATES PATENT AND TRADEMARK OFFICE
CERTIFICATE OF CORRECTION

PATENT NO. : 4,725,725
DATED : Feb. 16, 1988
INVENTOR(S) : Hideo ANDO

It is certified that error appears in the above-identified patent and that said Letters Patent is hereby corrected as shown below:

ON THE FIRST INFORMATION PAGE:

Insert: --[73] Assignee: Kabushiki Kaisha Toshiba, Kawasaki, Japan--.

Signed and Sealed this

Fourth Day of October, 1988

*Attest:*

DONALD J. QUIGG

*Attesting Officer*  *Commissioner of Patents and Trademarks*